United States Patent [19]
de Souza

[11] Patent Number: 5,384,032
[45] Date of Patent: Jan. 24, 1995

[54] WATER PURIFYING AND STERILIZING APPARATUS

[75] Inventor: Dacio M. de Souza, Sao Paulo, Brazil

[73] Assignee: Brasfilter Industria E Comercio Ltda., Sao Paulo, Brazil

[21] Appl. No.: 67,351

[22] Filed: May 26, 1993

[30] Foreign Application Priority Data

May 29, 1992 [BR] Brazil .............................. MU-7200809

[51] Int. Cl.⁶ ..................... B01D 17/12; B01D 35/06
[52] U.S. Cl. .................................. 210/104; 210/251; 210/259; 210/264; 422/186.3
[58] Field of Search ................... 422/186.3; 210/102, 210/103, 104, 116, 117, 134, 141, 142, 252, 259, 260, 264, 282, 287, 416.3, 748

[56] References Cited

U.S. PATENT DOCUMENTS

| | | | |
|---|---|---|---|
| 4,842,723 | 6/1989 | Parks et al. | 210/251 |
| 4,969,991 | 11/1990 | Valadez | 210/104 |
| 5,174,901 | 12/1992 | Smith | 210/264 |
| 5,236,595 | 8/1993 | Wang et al. | 210/259 |

Primary Examiner—Robert A. Dawson
Assistant Examiner—W. L. Walker
Attorney, Agent, or Firm—Steinberg, Raskin & Davidson

[57] ABSTRACT

A WATER PURIFYING AND STERILIZING APPARATUS including a box (1) within which three filtering chambers are provided, one of which (4) containing resin as a filtering element within its interior, the other (5) with charcoal as a filtering element within its interior, while the third (6) carries within an ultraviolet lamp (8), with said chamber (6) being provided with a flow baffle (13), comprised of a circular part (14) centrally provided with a circular orifice (15) that surrounds the said lamp (8), being made up of U-shaped sections (16), interconnected by ramps (17), describing rectangular openings (18) for water to flow through.

12 Claims, 2 Drawing Sheets

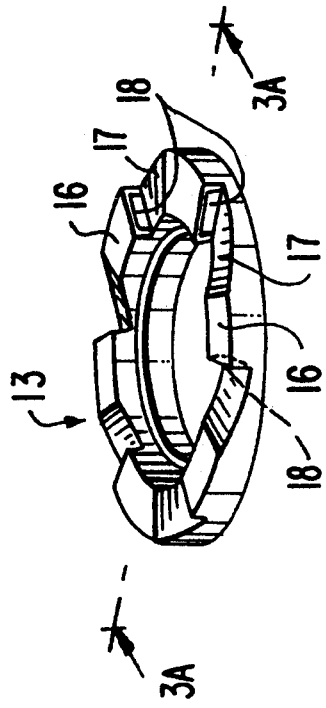
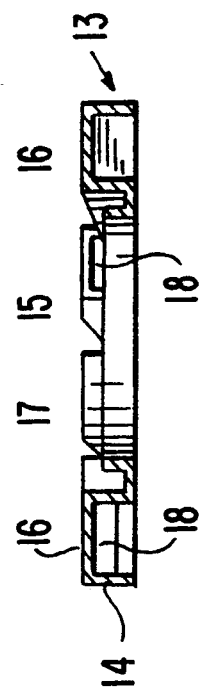
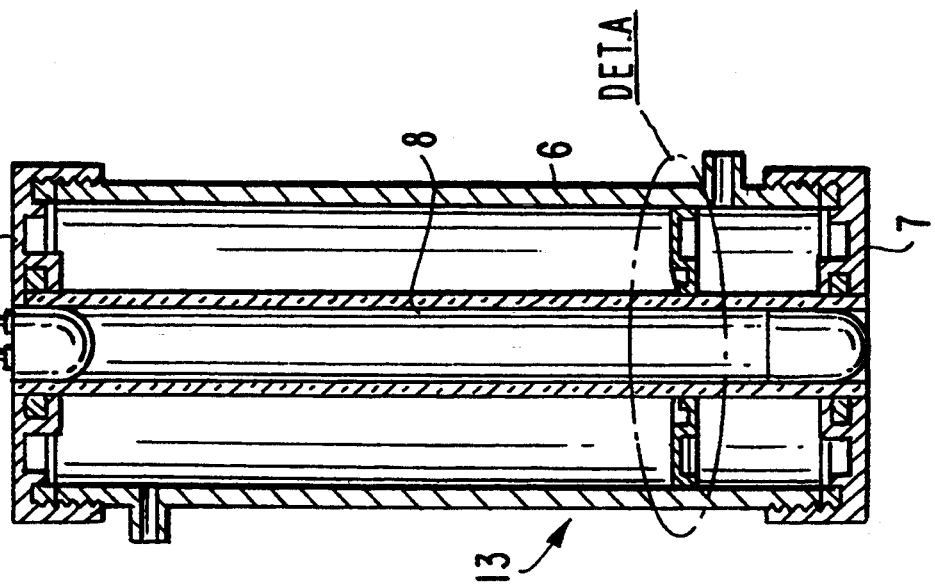

WATER PURIFYING AND STERILIZING APPARATUS

The present utility model patent describes a new constructive arrangement for a water purifying and sterilizing apparatus, of the type provided with two filtering chambers filled with different types of filtering agents, namely charcoal and resin, and with a third filtering chaffer, internally supplied with an ultraviolet lamp positioned within a quartz tube, which chambers are provided with a flow baffle designed to force water to circulate spirally around the said lamp, thereby affording better efficiency in the treatment of water, which is kept safely free of germs and bacteria.

For the purpose of illustration, drawings of the present model are attached, wherein the same will be more properly visualized:

FIG. 2 is a side cutaway view of the filtering chamber within which is provided the ultraviolet lamp and, around the latter, the hereby innovated flow baffle;

FIG. 3 is an enlarged detail of the said baffle (detail A) in which it is illustrated in perspective; finally, FIG. 3A is a section of the baffle along line A—A indicated in the previous figure.

Figure 1:
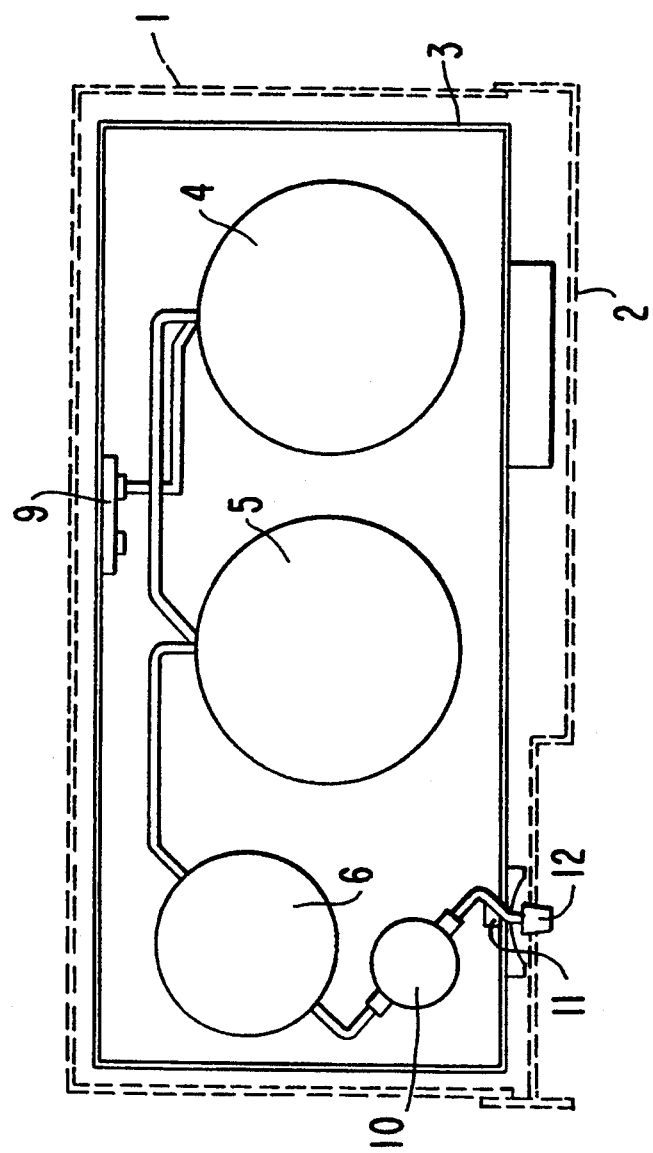
FIG. 1 is a top schematic view of a water purifying and sterilizing apparatus provided with the present constructive arrangement.

The object of tile present utility model patent of a "CONSTRUCTIVE ARRANGEMENT FOR A WATER PURIFYING AND STERILIZING APPARATUS", of the type comprised of a block-shaped box (1), closed at the front by a cover (2) and within which a tray (3) is mounted holding three cylindrical filtering chambers (4), (5) and (6), the first two comprised internally of a likewise cylindrical replaceable refill, containing within its interior a respective filtering element able to withhold heavy metals and other solids contained by tile water, and in chamber (4) the said filtering element is comprised of resin for ionic exchange, while in chamber (5) it is made up of charcoal; the third chamber (6), with covers (7) on its upper and lower ends, carries within an ultraviolet lamp (8) positioned inside a quartz tube; said box (1) is further provided with a rear water inlet (9) and a solenoid valve (10) by which the water is released, said valve being actuated by a microswitch (11) positioned on the panel of the front cover (2), whereon an on/off switch and monitor lamp are also provided, the latter to indicate whether the ultraviolet lamp is operating, in addition to a water outlet spout (12) in accordance with the present constructive arrangement, within the filtering chamber (6), adjoining its lower end, a flow baffle (13) is provided, comprised of a circular part (14) of substantially low height, with a diameter equal to the inside diameter of the chamber (6), being centrally provided with a circular orifice (15) with the same diameter as that of the quartz tube encircling the ultraviolet lamp (8), so as to surround it; said part (14) is made up by a plurality of U-shaped sections (16), interconnected with one another by ramps (17) that extend from the upper face of each section (16) until the median height of the adjoining section (16), describing rectangular openings (18) for water to flow through.

Due to the design of the baffle (13), the latter forces the water to circulate along a spiral path around the ultraviolet lamp (8), since the water coming from the lower part of the chamber (6), after passing through the openings of the baffle (13), is forced to "crash" into the ramps (17) thereon, causing a spiralling turbulence, which accounts for a greeter efficiency in doing away with the water's germs and bacteria.

What is claimed is:

1. A water purifying and sterilizing apparatus, comprising
    a block-shaped box having an interior in which water is purified and sterilized,
    a cover for closing said box at a front thereof,
    a rear water inlet through which water is passed into said box,
    a tray mounted in said box,
    three cylindrical filtering chambers retaining in said tray, a first and second one of said chambers each comprising a filtering element in an interior thereof for filtering water passing through said first and second chambers, respectively,
    an ultraviolet lamp arranged in an interior of a third one of said chambers for sterilizing water passing through said third chamber, said third chamber being sealed by upper and lower covers,
    a monitor lamp for indicating operation of said ultraviolet lamp,
    a solenoid valve for releasing purified water,
    a microswitch for actuating said solenoid valve to release water,
    an on/off switch to actuate said apparatus,
    a water outlet spout coupled to said solenoid valve for passing water therethrough, and
    a flow baffle arranged in a lower portion of said third chamber, said flow baffle comprising a circular part having a substantially low height, said circular part having a diameter substantially equal to the diameter of the interior of said third chamber, said flow baffle having a central, circular orifice having a diameter substantially equal to the diameter of said ultraviolet lamp such that said flow baffle surrounds said ultraviolet lamp, said circular part comprising a plurality of U-shaped sections interconnected by ramps that extend from an upper face of each of said U-shaped sections to a median height of an adjacent one of said U-shaped sections, such that rectangular openings are defined in said flow baffle through which water flows.

2. The apparatus of claim 1, wherein said filtering element in said first chamber is resin and said filtering element in said second chamber is charcoal.

3. The apparatus of claim 1, wherein said microswitch is positioned on said cover.

4. The apparatus of claim 1, wherein said ultraviolet lamp comprises a quartz tube, said orifice in said flow baffle surrounding said quartz tube.

5. The apparatus of claim 1, wherein said rectangular openings defined in said flow baffle are arranged to circulate water in a spiral around said ultraviolet lamp.

6. In a water purifying and sterilizing apparatus, including a first, second and third filtering chamber, said first and second chambers having a filtering material in an interior thereof for filtering water passing through said first and second chambers, and said third chamber having an ultraviolet lamp arranged therein for sterilizing water passing through said third chamber, the improvement comprising:
    a flow baffle arranged in a lower portion of said third chamber, said flow baffle comprising a circular part having a substantially low height, said circular part having a diameter substantially equal to the diameter of the interior of said third chamber, said flow baffle having a central, circular orifice having a diameter substantially equal to the diameter of said ultraviolet lamp such that said flow baffle surrounds said ultraviolet lamp, said circular part comprising a plurality of U-shaped sections interconnected by ramps that extend from an upper face of each of said U-shaped sections to a median height of an adjacent one of said U-shaped sections, such that rectangular openings are defined in said flow baffle through which water flows.

7. The apparatus of claim 6, further comprising a monitor lamp for indicating operation of said ultraviolet lamp.

8. The apparatus of claim 6, further comprising a water inlet through which water is passed into said apparatus and through said first, second and third chambers, a solenoid valve for releasing purified water, a microswitch for actuating said solenoid valve to release water, an on/off switch to actuate said apparatus, and a water outlet spout coupled to said solenoid valve for passing water therethrough.

9. The apparatus of claim 6, wherein said filtering element in said first chamber is resin and said filtering element in said second chamber is charcoal.

10. The apparatus of claim 6, wherein said ultraviolet lamp comprises a quartz tube, said orifice in said flow baffle surrounding said quartz tube.

11. The apparatus of claim 6, wherein said rectangular openings defined in said flow baffle are arranged to circulate water in a spiral around said ultraviolet lamp.

12. A water purifying and sterilizing apparatus, comprising
a block-shaped box having an interior in which water is purified and sterilized,
a tray situated in said box interior,
three cylindrical filtering chambers retained in said tray, a first and second one of said chambers comprising a filtering element in an interior thereof for filtering water passing therethrough,
a water inlet through which water is passed into said chambers in said box,
an ultraviolet lamp arranged in an interior of a third one of said chambers for sterilizing water passing therethrough,
a water outlet spout through which purified and sterilized water is removed from said apparatus, said water outlet spout being coupled to said third chamber, and
a flow baffle arranged in a lower portion of said third chamber, said flow baffle comprising a circular part having a substantially low height, said circular part having a diameter substantially equal to the diameter of the interior of said third chamber, said flow baffle having a central, circular orifice having a diameter substantially equal to the diameter of said ultraviolet lamp such that said flow baffle surrounds said ultraviolet lamp, said circular part comprising a plurality of U-shaped sections interconnected by ramps that extend from an upper face of each of said U-shaped sections to a median height of an adjacent one of said U-shaped sections, such that rectangular openings are defined in said flow baffle through which water flows.

* * * * *